US012747804B2

(12) United States Patent
Zhang et al.

(10) Patent No.: US 12,747,804 B2
(45) Date of Patent: Sep. 29, 2026

(54) EXPANSION VALVE COIL STRUCTURE AND PREPARING METHOD THEREOF, AND EXPANSION VALVE

(71) Applicant: ZHEJIANG DUNAN ARTIFICIAL ENVIRONMENT CO., LTD., Shaoxing (CN)

(72) Inventors: Jiyou Zhang, Shaoxing (CN); Yonghao Chen, Shaoxing (CN); Lifeng Zheng, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 237 days.

(21) Appl. No.: 18/676,655

(22) Filed: May 29, 2024

(65) Prior Publication Data

US 2024/0309962 A1 Sep. 19, 2024

Related U.S. Application Data

(63) Continuation-in-part of application No. PCT/CN2022/134248, filed on Nov. 25, 2022.

(30) Foreign Application Priority Data

Nov. 30, 2021 (CN) ......................... 202122989503.4

(51) Int. Cl.

| | |
|---|---|
| ***F16K 27/02*** | (2006.01) |
| ***F16K 31/06*** | (2006.01) |
| ***F16K 51/00*** | (2006.01) |

(52) U.S. Cl.
CPC ........ *F16K 27/029* (2013.01); *F16K 31/0675* (2013.01); *F16K 51/00* (2013.01)

(58) Field of Classification Search
CPC .... F16K 27/029; F16K 31/0675; F16K 51/00; F16K 31/06; H01F 7/128; H01F 27/23; H01F 7/081; F25B 41/345; Y02B 30/70
See application file for complete search history.

(56) References Cited

FOREIGN PATENT DOCUMENTS

| | | | |
|---|---|---|---|
| CN | 101777408 A | | 7/2010 |
| CN | 102758947 A | * | 10/2012 |
| CN | 205816124 U | | 12/2016 |
| CN | 108533807 A | | 9/2018 |

(Continued)

OTHER PUBLICATIONS

International Search Report of PCT/CN2022/134248.
Notice of Reasons for Refusal of JP2024-525994.
European search report of EP22900382.7.

*Primary Examiner* — Mohamad A Musleh

(57) ABSTRACT

An expansion valve coil structure, a method for preparing an expansion valve coil structure and an expansion valve are provided. The expansion valve coil structure includes a stator housing and an electromagnetic pole plate, the stator housing and the electromagnetic pole plate are disposed opposite to each other. The stator housing and the electromagnetic pole plate are both provided with a plurality of processed exposed surfaces. A surface of the stator housing and a surface of the electromagnetic pole plate are covered with a first antirust layer. Each of the plurality of processed exposed surfaces is covered with a second antirust layer The expansion valve includes the expansion valve coil structure.

14 Claims, 3 Drawing Sheets

(56) References Cited

FOREIGN PATENT DOCUMENTS

| | | | | | |
|---|---|---|---|---|---|
| CN | 111434403 | A | | 7/2020 | |
| CN | 214626535 | U | * | 11/2021 | |
| CN | 217463394 | U | | 9/2022 | |
| JP | H0819241 | A | * | 1/1996 | ............... H02K 1/02 |
| JP | H0865994 | A | | 3/1996 | |
| JP | 2001153255 | A | | 6/2001 | |
| WO | WO-2022054746 | A1 | * | 3/2022 | ............. F16K 31/06 |

* cited by examiner

EXPANSION VALVE COIL STRUCTURE AND PREPARING METHOD THEREOF, AND EXPANSION VALVE

CROSS-REFERENCE TO RELATED APPLICATIONS

This application is a continuation in part of international patent application No. PCT/CN2022/134248, filed on Nov. 25, 2022, which itself claims priority to Chinese patent application No. 202122989503.4, filed on Nov. 30, 2021, and titled "EXPANSION VALVE COIL STRUCTURE AND EXPANSION VALVE". The contents of the above identified applications are hereby incorporated herein in their entireties by reference.

TECHNICAL FIELD

The present disclosure relates to the field of electromagnetic valve technology, and in particular, to an expansion valve coil structure, a preparing method thereof and an expansion valve.

BACKGROUND

In the related art, materials used for processing an expansion valve coil structure are usually coated with antirust materials. After the corresponding materials are processed to form a stator housing and an electromagnetic pole plate, an antirust layer on material surfaces of the stator housing and the electrode plate may be destroyed, and there were a plurality of exposed surfaces formed by processing, which greatly weakened an antirust ability of the formed expansion valve coil structure.

SUMMARY

According to various embodiments of the present disclosure, an expansion valve coil structure and an expansion valve are provided with enhanced antirust ability and comprehensive antirust.

The present disclosure provides an expansion valve coil structure. The expansion valve coil structure includes a stator housing and an electromagnetic pole plate. The stator housing and the electromagnetic pole plate are disposed opposite to each other. The stator housing and the electromagnetic pole plate are both provided with a plurality of processed exposed surfaces. A surface of the stator housing and a surface of the electromagnetic pole plate are covered with a first antirust layer, and each of the plurality of processed exposed surfaces is covered with a second antirust layer.

With this arrangement, it can be ensured that each processed exposed surface of the stator housing and each processed exposed surface of the electromagnetic pole plate are covered with the second antirust layer. It can effectively improve an antirust ability of the stator housing and an antirust ability of the electromagnetic pole plate, thereby enhancing an antirust ability of the expansion valve coil structure and prolonging a service life of the expansion valve coil structure.

In some embodiments, a thickness of the second antirust layer is in a range of 2 μm to 30 μm.

Within this thickness range, the second antirust layer has little influence on a magnetic conductivity energy of the electromagnetic pole plate, and an antirust effect of the electromagnetic pole plate is greater. Considering magnetic conductivity energy, antirust effect and processing technology, the thickness of the second antirust layer can be in a range of 2 μm to 30 μm. In this way, a requirement for machining accuracy is low, and a machining difficulty is reduced.

In some embodiments, the thickness of the second antirust layer is in a range of 8 μm to 16 μm.

With this arrangement, the influence of the second antirust layer on the magnetic conductivity energy of the electromagnetic pole plate can be ignored.

In some embodiments, the second antirust layer is disposed on each of the plurality of processed exposed surfaces by plating or coating.

The second antirust layer is coated on each surface by plating or coating, the plating or coating process is simple, and each surface can be evenly covered with the second antirust layer, especially for hidden positions such as hole walls and bending corners. This process can effectively coat hidden positions.

In some embodiments, a plurality of first claw electrodes are formed on the stator housing, and the plurality of first claw electrodes are distributed at intervals along a circumferential direction of the stator housing; a plurality of second claw electrodes are correspondingly processed on the electromagnetic pole plate, the plurality of second claw electrodes are distributed at intervals along a circumferential direction of the electromagnetic pole plate, the plurality of first claw electrodes and the plurality of second claw electrodes are arranged opposite to each other and inserted in an alternating configuration in intervals to enclose and form an internal hole of the expansion valve coil structure.

In some embodiments, the plurality of processed exposed surfaces includes surfaces of the plurality of first claw electrodes and surfaces of the plurality of second claw electrodes.

With this arrangement, an antirust property of the plurality of first claw electrodes and an antirust property of the plurality of second claw electrodes are effectively enhanced.

In some embodiments, the stator housing is provided with a plurality of first positioning holes, and the second antirust layer is further disposed on a hole wall of each of the plurality of first positioning holes.

In some embodiments, a circumferential side wall of the stator housing is provided with an avoidance port, and the second antirust layer is further disposed on each surface of the avoidance port.

In some embodiments, the electromagnetic pole plate is provided with a plurality of second positioning holes and a plurality of third positioning holes, and the second antirust layer is further disposed on a hole wall of each of the plurality of second positioning holes and a hole wall of each of the plurality of third positioning holes, respectively.

The present disclosure further provides an expansion valve including the above expansion valve coil structure is provided.

In some embodiments, a thickness of the second antirust layer is in a range of 2 μm to 30 μm.

In some embodiments, the second antirust layer is disposed on each of the plurality of processed exposed surfaces by plating or coating.

In some embodiments, a plurality of first claw electrodes are formed on the stator housing, and the plurality of first claw electrodes are distributed at intervals along a circumferential direction of the stator housing; a plurality of second claw electrodes are correspondingly processed on the electromagnetic pole plate, the plurality of second claw electrodes are distributed at intervals along a circumferential direction of the electromagnetic pole plate, the plurality of first claw electrodes and the plurality of second claw electrodes are arranged opposite to each other and inserted in an alternating configuration in intervals to enclose and form an internal hole of the expansion valve coil structure, and the plurality of processed exposed surfaces comprises surfaces of the plurality of first claw electrodes and surfaces of the plurality of second claw electrodes.

In some embodiments, the stator housing is provided with a plurality of first positioning holes, and the second antirust layer is further disposed on a hole wall of each of the plurality of first positioning holes.

In some embodiments, a circumferential side wall of the stator housing is provided with an avoidance port, and the second antirust layer is further disposed on each surface of the avoidance port.

In some embodiments, the electromagnetic pole plate is provided with a plurality of second positioning holes and a plurality of third positioning holes, and the second antirust layer is further disposed on a hole wall of each of the plurality of second positioning holes and a hole wall of each of the plurality of third positioning holes, respectively.

The present disclosure further provides a method for preparing an expansion valve coil structure. The method includes following steps: S1, providing a material to be processed, wherein a surface of the material to be processed is provided a first antirust layer; S2, processing and shaping the material to be processed to form a stator housing and an electromagnetic pole plate, wherein the stator housing and the electromagnetic pole plate are both provided with a plurality of processed exposed surfaces, the plurality of processed exposed surfaces is without the first antirust layer; and S3, coating each of the plurality of processed exposed surfaces with a second antirust layer.

A thickness of the second antirust layer is in a range of 2 μm to 30 μm.

In step S2, processing and shaping the material to be processed to form the stator housing and the electromagnetic pole plate further includes: forming a plurality of first claw electrodes on the stator housing and a plurality of second claw electrodes on the electromagnetic pole plate, wherein the plurality of first claw electrodes are distributed at intervals along a circumferential direction of the stator housing; the plurality of second claw electrodes are distributed at intervals along a circumferential direction of the electromagnetic pole plate, the plurality of first claw electrodes and the plurality of second claw electrodes are arranged opposite to each other and inserted in an alternating configuration in intervals to enclose and form an internal hole of the expansion valve coil structure, the plurality of processed exposed surfaces includes surfaces of the plurality of first claw electrodes and surfaces of the plurality of second claw electrodes.

In step S3, coating each of the plurality of processed exposed surfaces with the second antirust layer includes: coating each of the plurality of processed exposed surfaces with the second antirust layer by plating or coating.

In some embodiment, step S2 of processing and shaping the material to be processed to form the stator housing and the electromagnetic pole plate further includes: forming a plurality of first positioning holes on the stator housing. Step S3 of coating each of the plurality of processed exposed surfaces with the second antirust layer further includes: coating the second antirust layer on a hole wall of each of the plurality of first positioning holes.

In some embodiment, step S2 of processing and shaping the material to be processed to form the stator housing and the electromagnetic pole plate further includes: forming an avoidance port on a circumferential side wall of the stator housing. Step S3 of coating each of the plurality of processed exposed surfaces with the second antirust layer further includes: coating the second antirust layer on a surface of the avoidance port.

In some embodiment, step S2 of processing and shaping the material to be processed to form the stator housing and the electromagnetic pole plate further includes: forming a plurality of second positioning holes and a plurality of third positioning holes on the electromagnetic pole plate. Step S3 of coating each of the plurality of processed exposed surfaces with the second antirust layer further includes: coating the second antirust layer on a hole wall of each of the plurality of second positioning holes and a hole wall of each of the plurality of third positioning holes, respectively.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

Reference signs are as follows: 100 represents an expansion valve coil structure; 10 represents a stator housing; 11 represents a first claw electrode; 12 represents an avoidance port; 14 represents a first positioning hole; 20 represents an electromagnetic pole plate; 21 represents a second claw electrode; 22 represents an ear portion; 23 represents a second positioning hole; 24 represents a third positioning hole; 30 represents a coil framework; 31 represents a plug wire portion; 40 represents an internal hole; 50 represents a processed exposed surface; **60*a* represents a first antirust layer; 60*b* represents a second antirust layer; 70 represents a coil; and 200** represents an expansion valve.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is considered to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Figure 3:
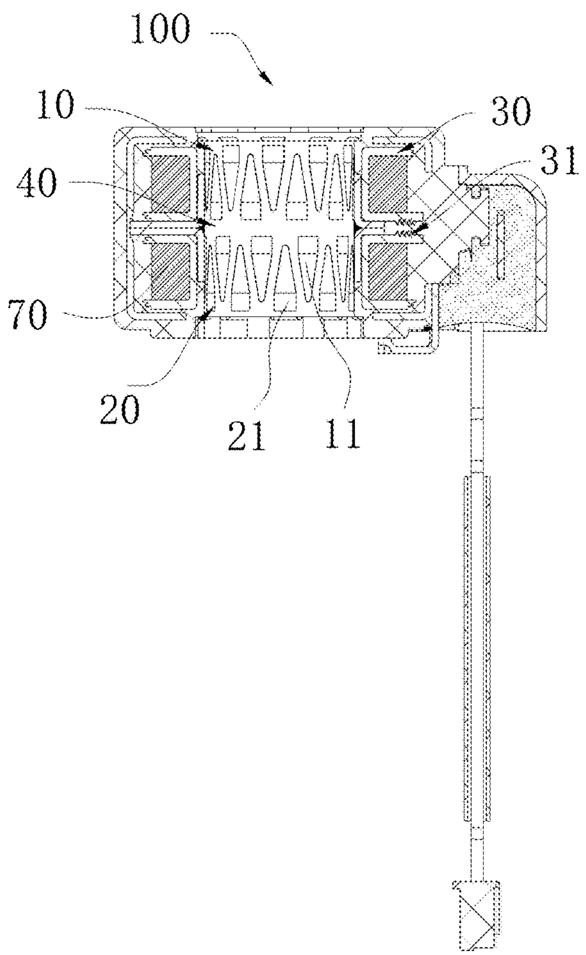
FIG. 3 is a sectional view of an expansion valve coil structure in an embodiment of the present disclosure.
Figure 4:
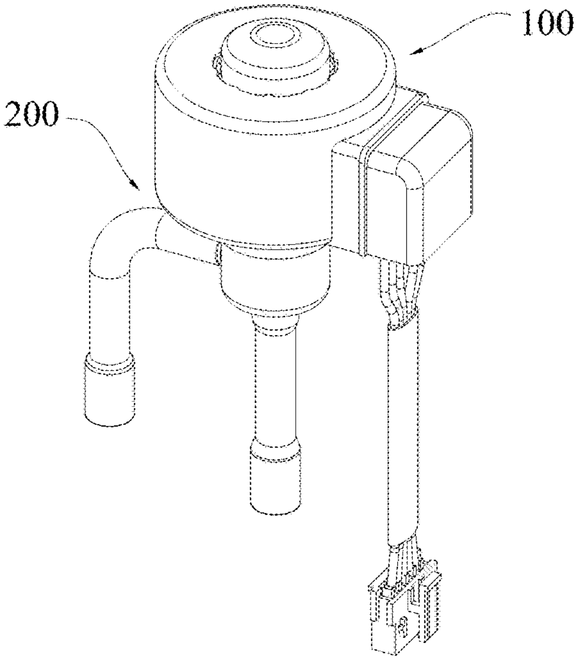
FIG. 4 is a schematic view of an expansion valve in an embodiment of the present disclosure.
Figure 5:
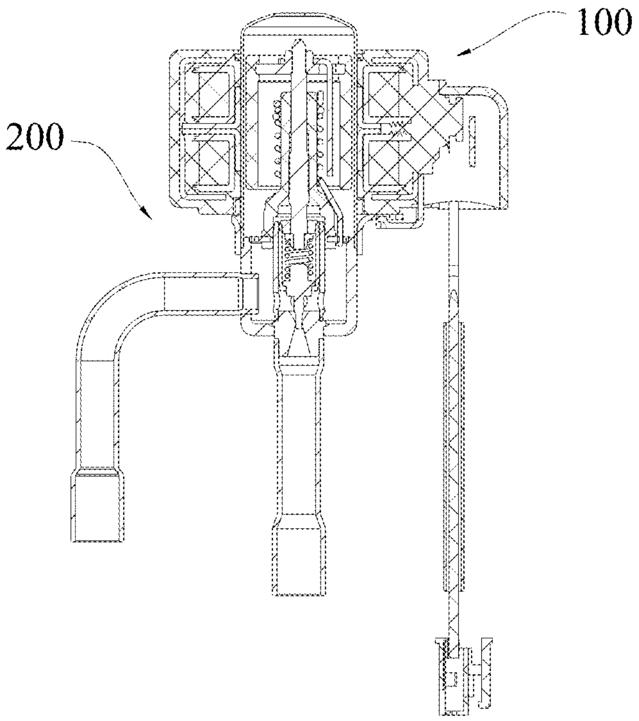
FIG. 5 is a sectional view of an expansion valve in an embodiment of the present disclosure.

Referring to FIG. 3 to FIG. 5, the present disclosure provides an expansion valve 200. The expansion valve 200 is mainly composed of a valve body (not shown) and an expansion valve coil structure 100. The expansion valve coil structure 100 includes a stator housing 10 and an electromagnetic pole plate 20, and the stator housing 10 and the electromagnetic pole plate 20 are disposed opposite to each other.

The stator housing 10 and the electromagnetic pole plate 20 are main components of the expansion valve coil structure 100. However, in the related art, before processing, surfaces of materials used to form the stator housing and the electromagnetic pole plate have been coated with antirust coatings. After processing and molding, an antirust layer on a surface of raw materials is damaged, and there are many processed exposed surfaces such as incision and cut surface on the molded stator housing 10 and the electromagnetic pole plate. Without the antirust layer on each of the processed exposed surface, the stator housing and the electromagnetic pole plate are easy to rust and cannot effectively protect coil, which affects a service life and effect of the expansion valve.

Referring to FIG. 1, FIG. 2, and FIGS. 7-8, the stator housing 10 and the electromagnetic pole plate 20 are both provided with a plurality of processed exposed surfaces 50. A surface of the stator housing 10 and a surface of the electromagnetic pole plate 20 are covered with a first antirust layer 60*a*, and each of the plurality of processed exposed surfaces 50 is covered with a second antirust layer 60*b*.

In the present disclosure, the stator housing 10 and the electromagnetic pole plate 20 after processing and molding are rusted. The processed exposed surface 50 on the stator housing 10 and the electromagnetic pole plate 20 is covered by the second antirust layer 60*b* to achieve comprehensive rust protection. It can effectively improve an antirust ability of the stator housing 10 and an antirust ability of the electromagnetic pole plate 20, thereby enhancing an antirust ability of the expansion valve coil structure 200 and prolonging a service life of the expansion valve coil structure 100.

Figure 6:
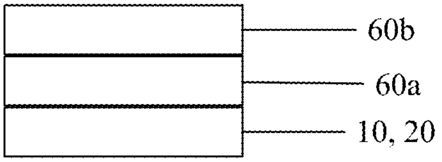
FIG. 6 is a sectional view of a second antirust layer of an expansion valve in an embodiment of the present disclosure.
Figure 7:
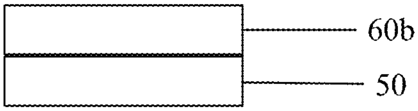
FIG. 7 is a sectional view of a second antirust layer of an expansion valve in another embodiment of the present disclosure.
Figure 8:
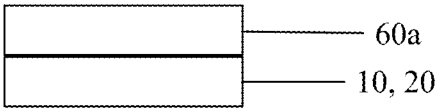
FIG. 8 is a sectional view of a first antirust layer of an expansion valve in another embodiment of the present disclosure.

In another embodiment, referring to FIG. 6, the surface of the stator housing 10 and the surface of the electromagnetic pole plate 20 are covered with the first antirust layer 60*a* and the second antirust layer 60*b*.

Figure 1:
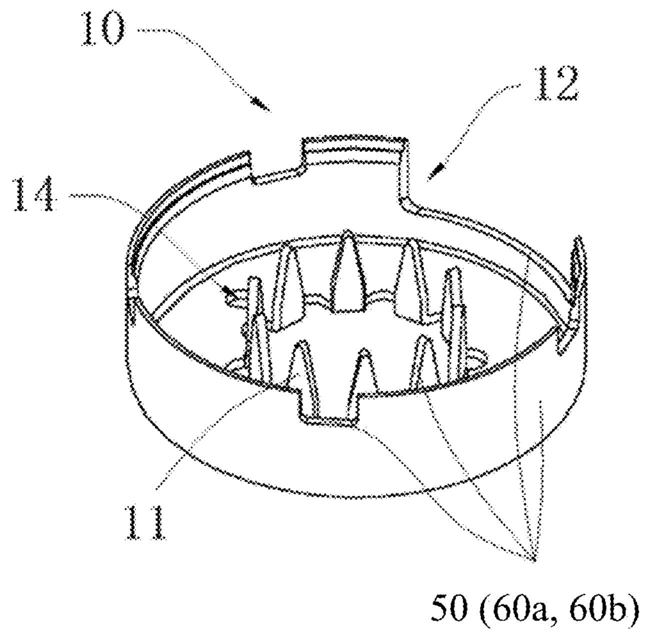
FIG. 1 is a schematic view of a stator housing in an embodiment of the present disclosure.
Figure 2:
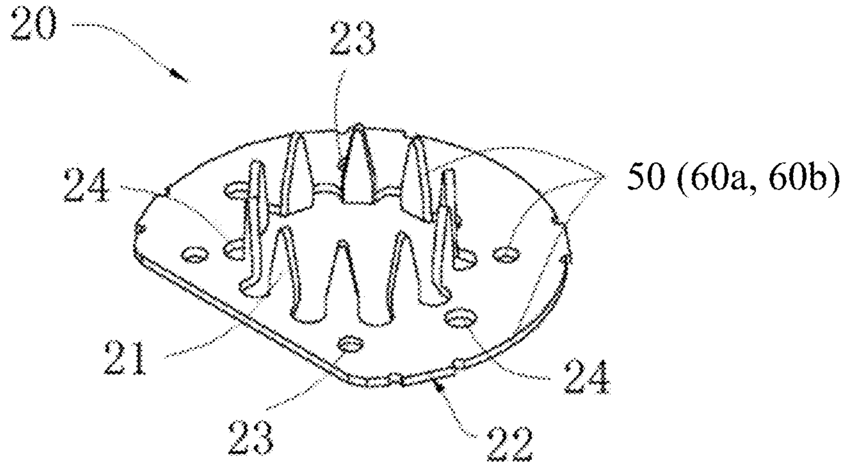
FIG. 2 is a schematic view of an electromagnetic pole plate in an embodiment of the present disclosure.

Referring to FIG. 1 and FIG. 2, a plurality of first claw electrodes 11 are formed on the stator housing 10, and the plurality of first claw electrodes 11 are distributed at intervals along a circumferential direction of the stator housing 10. A plurality of second claw electrodes 21 are correspondingly processed on the electromagnetic pole plate 20, the plurality of second claw electrodes 21 are distributed at intervals along a circumferential direction of the electromagnetic pole plate 20. The plurality of first claw electrodes 11 and the plurality of second claw electrodes 21 are arranged opposite to each other and inserted in an alternating configuration in intervals to enclose and form an internal hole 40 of the expansion valve coil structure 200.

In an embodiment, the processed exposed surface 50 includes surfaces of the plurality of first claw electrodes 11 and surfaces of the plurality of second claw electrodes 21. The plurality of first claw electrodes 11 and the plurality of second claw electrodes 21 are processed and formed on the stator housing 10 and the electromagnetic pole plate 20, respectively, which leads to a destruction of the first antirust layer 60*a* in the raw materials, and additional incisions or cut surfaces are generated during processing. By coating the second antirust layer 60*b* on the cut surfaces and/or incisions formed after the processing of the plurality of first claw electrodes 11 and the plurality of second claw electrode 21, the antirust ability of the plurality of first claw electrodes 11 and the plurality of second claw electrodes 21 can be effectively improved.

The expansion valve coil structure 100 further includes a coil framework 30, and a coil 70 is wound around the coil framework 30 to form a coil winding. The coil winding is located between the stator housing 10 and the electromagnetic pole plate 20, and the plurality of first claw electrodes 11 and the plurality of second claw electrodes 21 are located in the coil winding. Such that the coiled coil 70 is enclosed outside the internal hole 40 of the expansion valve coil structure 100.

Referring to FIG. 1, the stator housing 10 is provided with a plurality of first positioning holes 14, and positioning protrusions of the coil framework 30 extend into the plurality of first positioning holes 14 to realize a positioning between the coil framework 30 and the stator housing 10. In some embodiments, the second antirust layer 60*b* is further disposed on a hole wall of each of the first positioning holes 14, that is, the processed exposed surface 50 includes a hole wall surface of the first positioning hole 14. In this way, the stator housing 10 can be protected from details, and a joint between the stator housing 10 and the coil framework 30 can be prevented from rusting, which will affect a connection stability and a service life of the stator housing 10 and a connection stability and a service life of the coil framework 30.

Referring to FIG. 1 and FIG. 3, a circumferential side wall of the stator housing 10 is provided with an avoidance port 12, and when assembled, the stator housing 10 covers the coil framework 30 and the electromagnetic pole plate 20. The avoidance port 12 is configured for parts of the coil framework 30 protruding from the stator housing 10 to pass through, such as the plug wire portion 31 protruding from the coil framework 30 and the ear part 22 protruding from the electromagnetic pole plate 20. In addition, the second antirust layer 60*b* is further disposed on the avoidance port 12, that is, the processed exposed surface 50 includes the machined surface of the avoidance port 12, thereby preventing the local position of the stator housing 10 from rusting and enhancing the antirust ability of the stator housing 10.

Referring to FIG. 2 and FIG. 3, the electromagnetic pole plate 20 is provided with a plurality of second positioning holes 23 and a plurality of third positioning holes 24. A hole wall of each of the plurality of second positioning holes 23 and a hole wall of each of the plurality of third positioning holes 24 are covered with the second antirust layer 60*b*, that is, the processed exposed surface 50 includes wall surfaces of the plurality of second positioning holes 23 and wall surfaces of the plurality of third positioning holes 24. The expansion valve coil structure 100 includes two coil frameworks 30, and two the electromagnetic pole plates 20 are located between the two coil frameworks 30. The plurality of second claw electrodes 21 of two of the electromagnetic pole plate 20 are arranged back-to-back. The plurality of second positioning holes 23 are configured to cooperate with the positioning protrusions on the adjacent electromagnetic pole plates 20 to realize mutual positioning between the electromagnetic pole plates 20. The plurality of third positioning holes 24 are configured for matching of positioning protrusions on the coil framework 30 to realize the mutual positioning between them, so that the two corresponding coil frameworks 30 are relatively fixed and a displacement of the coil framework 30 and the electromagnetic pole plate 20 is prevented.

In an embodiment, the plurality of second positioning holes 23 and the plurality of third positioning holes 24 are alternately arranged at intervals, so that the positioning positions are evenly distributed and positioning is more stable.

In an embodiment, the plurality of second positioning holes 23 and the plurality of third positioning holes 24 are arranged along a circumferential direction of the electromagnetic pole plate 20, so as to ensure that all directions of the electromagnetic pole plate 20 can be fixed and prevent the electromagnetic pole plate 20 from shifting.

In an embodiment, the second antirust layer 60*b* is disposed on the surface of the stator housing 10, the surface of the electromagnetic pole plate 20 and each of the plurality of processed exposed surfaces 50 by a plating process or a coating process. The plating process or the coating process is simple, and each surface can be evenly covered with the second antirust layer 60*b*, especially for hidden positions such as hole walls and bending corners. This process can effectively coat hidden positions. In other embodiments, a processing mode of the second antirust layer 60*b* is not limited to the above.

In an embodiment, a thickness of the second antirust layer 60*b* is in a range of 2 μm to 30 μm. When the thickness of the second antirust layer 60*b* is less than 2 μm, a surface coating is damaged and loses the antirust function in a production process, while when the thickness of the second antirust layer 60*b* is more than 30 μm, the thickness of the second antirust layer 60*b* is too thick, which is easy to cause the second antirust layer 60*b* to blister and fall off and lose the antirust function. Therefore, the thickness of the second antirust layer 60*b* is in the range of 2 μm to 30 μm in the present disclosure, and within this range, the second antirust layer 60*b* has little influence on magnetic conductivity performance of the electromagnetic pole plate 20. The thicker the second antirust layer 60*b*, the lower the requirements for coating or electroplating of the second antirust layer 60*b* are, thus reducing a processing cost of products. In other embodiments, the thickness of the second antirust layer 60*b* is not limited to the above thickness, and the thickness of the second antirust layer 60*b* can also be determined according to an actual application.

In an embodiment, the thickness of the second antirust layer 60*b* is in a range of 8 μm to 16 μm. With this arrangement, the influence of the second antirust layer 60*b* on the magnetic conductivity energy of the electromagnetic pole plate 20 can be ignored.

Furthermore, the second antirust layer 60*b* can be zinc plating, nickel plating, tin plating, chromium plating, etc. Of course, it can also be other anti-rust materials, such as alloy plating. The specific material of the antirust layer 60 can be selected according to the application environment, for example, in the organic acid environment, the antirust layer can be selected as tin coating. When electrochemical corrosion occurs, a plating metal at an anode is continuously lost to protect a base metal, and then the stator housing 10 and the electromagnetic pole plate 20 are electrochemically protected.

In an embodiment, the antirust layer 60 can be provided with one or more layers, and the materials of each layer can be the same or different, for example, the surface of the stator housing 10 is plated with zinc coating first, and then with chromium coating with higher hardness.

In an embodiment, the stator housing 10 and the electromagnetic pole plate 20 are made of non-austenitic stainless steel. This design can further improve a corrosion resistance of the product without affecting the magnetic permeability of the product. Non-austenitic stainless steel has good strength properties, which makes the plurality of first claw electrodes 11 and the plurality of second claw electrodes 21 difficult to deform, and it can avoid an influence of claw electrode deformation on an actuation performance. In addition, the thickness of the claw electrode can be further reduced, which is beneficial to a miniaturization of the expansion valve 200.

The present disclosure further provides a method for preparing an expansion valve coil structure. The method includes following steps: S1, providing a material to be processed, wherein a surface of the material to be processed is provided a first antirust layer 60*a*; S2, processing and shaping the material to be processed to form a stator housing 10 and an electromagnetic pole plate 20, wherein the stator housing 10 and the electromagnetic pole plate 20 are both provided with a plurality of processed exposed surfaces 50; and S3, coating each of the plurality of processed exposed surfaces 50 with a second antirust layer 60*b*.

A material of the first antirust layer 60*a* and a material of the second antirust layer 60*b* are the same or different.

A thickness of the second antirust layer 60*b* is in a range of 2 μm to 30 μm.

In step S2, processing and shaping the material to be processed to form the stator housing 10 and the electromagnetic pole plate 20 further includes: forming a plurality of first claw electrodes 11 on the stator housing 10 and a plurality of second claw electrodes 21 on the electromagnetic pole plate 20, wherein the plurality of first claw electrodes 11 are distributed at intervals along a circumferential direction of the stator housing 10; the plurality of second claw electrodes 21 are distributed at intervals along a circumferential direction of the electromagnetic pole plate 20, the plurality of first claw electrodes 11 and the plurality of second claw electrodes 21 are arranged opposite to each other and inserted in an alternating configuration in intervals to enclose and form an internal hole of the expansion valve coil structure 100, the plurality of processed exposed surfaces 50 includes surfaces of the plurality of first claw electrodes 11 and surfaces of the plurality of second claw electrodes 21.

In step S3, coating each of the plurality of processed exposed surfaces 50 with the second antirust layer 60*b* includes: coating each of the plurality of processed exposed surfaces 50 with the second antirust layer 60*b* by plating or coating.

Furthermore, step S3 of coating each of the plurality of processed exposed surfaces 50 with the second antirust layer 60*b* can include: coating each of the plurality of processed exposed surfaces 50, a surface of the stator housing 10, and a surface of the electromagnetic pole plate 20 with the second antirust layer 60*b* by plating or coating. That is, the plurality of processed exposed surfaces 50 is coated with the second antirust layer 60*b*, and other regions of the surface of the stator housing 10 and the surface of the electromagnetic pole plate 20 except for the plurality of processed exposed surfaces 50 are coated with the first antirust layer 60*a* and the second antirust layer 60*b*.

In some embodiment, step S2 of processing and shaping the material to be processed to form the stator housing 10 and the electromagnetic pole plate 20 further includes: forming a plurality of first positioning holes 14 on the stator housing 10. Step S3 of coating each of the plurality of processed exposed surfaces 50 with the second antirust layer 60*b* further includes: coating the second antirust layer 60*b* on a hole wall of each of the plurality of first positioning holes 14.

In some embodiment, step S2 of processing and shaping the material to be processed to form the stator housing 10 and the electromagnetic pole plate 20 further includes: forming an avoidance port 12 on a circumferential side wall of the stator housing 10. Step S3 of coating each of the plurality of processed exposed surfaces 50 with the second antirust layer 60*b* further includes: coating the second antirust layer 60*b* on a surface of the avoidance port 12.

In some embodiment, step S2 of processing and shaping the material to be processed to form the stator housing 10 and the electromagnetic pole plate 20 further includes: forming a plurality of second positioning holes 23 and a plurality of third positioning holes 24 on the electromagnetic pole plate 20. Step S3 of coating each of the plurality of processed exposed surfaces 50 with the second antirust layer 60*b* further includes: coating the second antirust layer 60*b* on a hole wall of each of the plurality of second positioning holes 23 and a hole wall of each of the plurality of third positioning holes 24, respectively.

In addition, it should be noted that the words "first" and "second" are used to define parts only for a convenience of distinguishing corresponding parts. Unless otherwise stated, the above words have no special meaning, so they cannot be understood as limiting a protection scope of the present invention.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. An expansion valve coil structure, comprising a stator housing and an electromagnetic pole plate, wherein the stator housing and the electromagnetic pole plate are disposed opposite to each other;

wherein the stator housing and the electromagnetic pole plate are both provided with a plurality of processed exposed surfaces; a surface of the stator housing and a surface of the electromagnetic pole plate are covered with a first antirust layer, and each of the plurality of processed exposed surfaces is covered with a second antirust layer.

2. The expansion valve coil structure of claim 1, wherein a thickness of the second antirust layer is in a range of 2 μm to 30 μm.

3. The expansion valve coil structure of claim 1, wherein the second antirust layer is disposed on each of the plurality of processed exposed surfaces by plating or coating.

4. The expansion valve coil structure of claim 1, wherein a plurality of first claw electrodes are formed on the stator housing, and the plurality of first claw electrodes are distributed at intervals along a circumferential direction of the stator housing; a plurality of second claw electrodes are correspondingly processed on the electromagnetic pole plate, the plurality of second claw electrodes are distributed at intervals along a circumferential direction of the electromagnetic pole plate, the plurality of first claw electrodes and the plurality of second claw electrodes are arranged opposite to each other and inserted in an alternating configuration in intervals to enclose and form an internal hole of the expansion valve coil structure, the plurality of processed exposed surfaces comprises surfaces of the plurality of first claw electrodes and surfaces of the plurality of second claw electrodes.

5. The expansion valve coil structure of claim 1, wherein the stator housing is provided with a plurality of first positioning holes, and the second antirust layer is further disposed on a hole wall of each of the plurality of first positioning holes.

6. The expansion valve coil structure of claim 1, wherein a circumferential side wall of the stator housing is provided with an avoidance port, and the second antirust layer is further disposed on a surface of the avoidance port.

7. The expansion valve coil structure of claim 1, wherein the electromagnetic pole plate is provided with a plurality of second positioning holes and a plurality of third positioning holes, and the second antirust layer is further disposed on a hole wall of each of the plurality of second positioning holes and a hole wall of each of the plurality of third positioning holes, respectively.

8. An expansion valve, comprising the expansion valve coil structure of claim 1.

9. The expansion valve of claim 8, wherein a thickness of the second antirust layer is in a range of 2 μm to 30 μm.

10. The expansion valve of claim 8, wherein the second antirust layer is disposed on each of the plurality of processed exposed surfaces by plating or coating.

11. The expansion valve of claim 8, wherein a plurality of first claw electrodes are formed on the stator housing, and the plurality of first claw electrodes are distributed at intervals along a circumferential direction of the stator housing; a plurality of second claw electrodes are correspondingly processed on the electromagnetic pole plate, the plurality of second claw electrodes are distributed at intervals along a circumferential direction of the electromagnetic pole plate, the plurality of first claw electrodes and the plurality of second claw electrodes are arranged opposite to each other and inserted in an alternating configuration in intervals to enclose and form an internal hole of the expansion valve coil structure, and the plurality of processed exposed surfaces comprises surfaces of the plurality of first claw electrodes and surfaces of the plurality of second claw electrodes.

12. The expansion valve of claim 8, wherein the stator housing is provided with a plurality of first positioning holes, and the second antirust layer is further disposed on a hole wall of each of the plurality of first positioning holes.

13. The expansion valve of claim 8, wherein a circumferential side wall of the stator housing is provided with an avoidance port, and the second antirust layer is further disposed on each surface of the avoidance port.

14. The expansion valve of claim 10, wherein the electromagnetic pole plate is provided with a plurality of second positioning holes and a plurality of third positioning holes, and the second antirust layer is further disposed on a hole wall of each of the plurality of second positioning holes and a hole wall of each of the plurality of third positioning holes, respectively.

* * * * *